United States Patent
Saito

(10) Patent No.: US 8,089,671 B2
(45) Date of Patent: Jan. 3, 2012

(54) OPTICAL SCANNING DEVICE, IMAGE DISPLAY DEVICE AND RETINAL SCANNING DISPLAY PROVIDED WITH OPTICAL SCANNING DEVICE

(75) Inventor: Katsuo Saito, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 345 days.

(21) Appl. No.: 12/585,559

(22) Filed: Sep. 17, 2009

(65) Prior Publication Data

US 2010/0046053 A1 Feb. 25, 2010

Related U.S. Application Data

(63) Continuation-in-part of application No. PCT/JP2008/054982, filed on Mar. 18, 2008.

(30) Foreign Application Priority Data

Mar. 20, 2007 (JP) .................................. 2007-073406

(51) Int. Cl.
G02B 26/08 (2006.01)
(52) U.S. Cl. ................................................... 359/199.1
(58) Field of Classification Search ............... 359/197.1, 359/199.1, 199.4, 204.1, 212.1–214.1, 221.1, 359/223.1–226.1
See application file for complete search history.

(56) References Cited

U.S. PATENT DOCUMENTS 4,037,231 A * 7/1977 Broyles et al. ............. 359/221.1
4,760,251 A 7/1988 Shimada et al.

FOREIGN PATENT DOCUMENTS

| JP | U-60-036621 | 3/1985 |
| JP | B2-05-003947 | 1/1993 |
| JP | A-07-020391 | 1/1995 |
| JP | A-07-191271 | 7/1995 |
| JP | A-08-286132 | 11/1996 |
| JP | A-2004-279544 | 10/2004 |
| JP | A-2005-181477 | 7/2005 |
| JP | A-2007-286423 | 11/2007 |
| WO | WO 2005/059624 A1 | 6/2005 |

OTHER PUBLICATIONS

Japanese Office Action mailed Sep. 6, 2011 issued in Japanese Patent Application No. 2007-073406.

* cited by examiner

*Primary Examiner* — Euncha Cherry
(74) *Attorney, Agent, or Firm* — Oliff & Berridge, PLC

(57) ABSTRACT

An optical scanning device includes a dot clock generator which generates a dot clock having a dot clock cycle corresponding to a scanning direction of an optical flux by dividing master clocks which constitute basic clocks with frequency-dividing-number corresponding to a scanning position. The dot clock generator changes, with respect to a group of dot clocks which is formed of plural sets of dot clocks in which a frequency-dividing-number sequence pattern of the set of dot clocks which is constituted of two or more continuous dot clocks is repeated plural times on one scanning line, the frequency-dividing-number sequence pattern of each set of dot clocks while maintaining a total value of frequency dividing numbers necessary for generating each set of dot clocks at a constant value.

13 Claims, 17 Drawing Sheets

Fig. 6

FREQUENCY-DIVIDING-NUMBER TABLE

| DOT CLOCK NUMBER | MASTER CLOCK FREQUENCY DIVIDING NUMBER | DOT CLOCK NUMBER | MASTER CLOCK FREQUENCY DIVIDING NUMBER |
|---|---|---|---|
| 1 | 6 | 31 | 3 |
| 2 | 5 | 32 | 4 |
| 3 | 6 | 33 | 3 |
| 4 | 5 | 34 | 4 |
| 5 | 4 | 35 | 3 |
| 6 | 5 | 36 | 4 |
| 7 | 4 | 37 | 3 |
| 8 | 5 | 38 | 4 |
| 9 | 4 | 39 | 3 |
| 10 | 4 | 40 | 4 |
| 11 | 4 | 41 | 3 |
| 12 | 4 | 42 | 4 |
| 13 | 4 | 43 | 3 |
| 14 | 4 | 44 | 4 |
| 15 | 4 | 45 | 4 |
| 16 | 3 | 46 | 3 |
| 17 | 4 | 47 | 4 |
| 18 | 4 | 48 | 4 |
| 19 | 3 | 49 | 4 |
| 20 | 4 | 50 | 4 |
| 21 | 3 | 51 | 4 |
| 22 | 4 | 52 | 4 |
| 23 | 3 | 53 | 5 |
| 24 | 4 | 54 | 4 |
| 25 | 3 | 55 | 5 |
| 26 | 4 | 56 | 5 |
| 27 | 3 | 57 | 5 |
| 28 | 3 | 58 | 5 |
| 29 | 4 | 59 | 5 |
| 30 | 3 | 60 | 6 |

Fig. 8

| DOT CLOCK NUMBER | AMPLITUDE % | OSCILLATION ANGLE rad | SPEED | 1/SPEED | THEORETICAL VALUE | | CORRECTED VALUE | |
|---|---|---|---|---|---|---|---|---|
| | | | | | NUMBER OF MASTER CLOCKS | CUMULATIVE VALUE | NUMBER OF MASTER CLOCKS | CUMULATIVE VALUE |
| 1 | 80.9 | 0.942 | 0.588 | 1.701 | 5.8 | 5.8 | 6 | 6 |
| 2 | 78.2 | 0.897 | 0.624 | 1.603 | 5.5 | 11.3 | 5 | 11 |
| 3 | 75.4 | 0.854 | 0.657 | 1.523 | 5.2 | 16.5 | 6 | 17 |
| 4 | 72.7 | 0.814 | 0.687 | 1.456 | 5.0 | 21.5 | 5 | 22 |
| 5 | 69.9 | 0.774 | 0.715 | 1.399 | 4.8 | 26.3 | 4 | 26 |
| 6 | 67.2 | 0.737 | 0.741 | 1.350 | 4.6 | 30.9 | 5 | 31 |
| 7 | 64.4 | 0.700 | 0.765 | 1.308 | 4.5 | 35.4 | 4 | 35 |
| 8 | 61.7 | 0.665 | 0.787 | 1.271 | 4.3 | 39.7 | 5 | 40 |
| 9 | 59.0 | 0.631 | 0.808 | 1.238 | 4.2 | 43.9 | 4 | 44 |
| 10 | 56.2 | 0.597 | 0.827 | 1.209 | 4.1 | 48.0 | 4 | 48 |
| 11 | 53.5 | 0.564 | 0.845 | 1.183 | 4.0 | 52.0 | 4 | 52 |
| 12 | 50.7 | 0.532 | 0.862 | 1.160 | 4.0 | 56.0 | 4 | 56 |
| 13 | 48.0 | 0.501 | 0.877 | 1.140 | 3.9 | 59.9 | 4 | 60 |
| 14 | 45.3 | 0.470 | 0.892 | 1.121 | 3.8 | 63.7 | 4 | 64 |
| 15 | 42.5 | 0.439 | 0.905 | 1.105 | 3.8 | 67.5 | 4 | 68 |
| 16 | 39.8 | 0.409 | 0.918 | 1.090 | 3.7 | 71.2 | 3 | 71 |
| 17 | 37.0 | 0.379 | 0.929 | 1.076 | 3.7 | 74.9 | 4 | 75 |
| 18 | 34.3 | 0.350 | 0.939 | 1.065 | 3.6 | 78.5 | 4 | 79 |
| 19 | 31.5 | 0.321 | 0.949 | 1.054 | 3.6 | 82.1 | 3 | 82 |
| 20 | 28.8 | 0.292 | 0.958 | 1.044 | 3.6 | 85.7 | 4 | 86 |
| 21 | 26.1 | 0.264 | 0.965 | 1.036 | 3.5 | 89.2 | 3 | 89 |
| 22 | 23.3 | 0.235 | 0.972 | 1.028 | 3.5 | 92.7 | 4 | 93 |
| 23 | 20.6 | 0.207 | 0.979 | 1.022 | 3.5 | 96.2 | 3 | 96 |
| 24 | 17.8 | 0.179 | 0.984 | 1.016 | 3.5 | 99.7 | 4 | 100 |
| 25 | 15.1 | 0.151 | 0.989 | 1.012 | 3.4 | 103.1 | 3 | 103 |
| 26 | 12.3 | 0.124 | 0.992 | 1.008 | 3.4 | 106.5 | 4 | 107 |
| 27 | 9.6 | 0.096 | 0.995 | 1.005 | 3.4 | 109.9 | 3 | 110 |
| 28 | 6.9 | 0.069 | 0.998 | 1.002 | 3.4 | 113.3 | 3 | 113 |
| 29 | 4.1 | 0.041 | 0.999 | 1.001 | 3.4 | 116.7 | 4 | 117 |
| 30 | 1.4 | 0.014 | 1.000 | 1.000 | 3.4 | 120.1 | 3 | 120 |

Fig. 9

FREQUENCY-DIVIDING-NUMBER TABLE (X1)

| DOT CLOCK NUMBER | MASTER CLOCK FREQUENCY DIVIDING NUMBER | |
|---|---|---|
| 1 | 6 | a1 } A |
| 2 | 5 | |
| 3 | 6 | a2 |
| 4 | 5 | |
| 5 | 4 | b1 } B |
| 6 | 5 | |
| 7 | 4 | b2 |
| 8 | 5 | |
| 9 | 4 | |
| 10 | 4 | |
| 11 | 4 | |
| 12 | 4 | |
| 13 | 4 | |
| 14 | 4 | |
| 15 | 4 | |
| 16 | 3 | |
| 17 | 4 | |
| 18 | 4 | c1 |
| 19 | 3 | |
| 20 | 4 | c2 |
| 21 | 3 | |
| 22 | 4 | c3 } C |
| 23 | 3 | |
| 24 | 4 | c4 |
| 25 | 3 | |
| 26 | 4 | c5 |
| 27 | 3 | |
| 28 | 3 | |
| 29 | 4 | |
| 30 | 3 | |

| DOT CLOCK NUMBER | MASTER CLOCK FREQUENCY DIVIDING NUMBER | |
|---|---|---|
| 31 | 3 | d1 |
| 32 | 4 | |
| 33 | 3 | d2 |
| 34 | 4 | |
| 35 | 3 | d3 |
| 36 | 4 | |
| 37 | 3 | d4 } D |
| 38 | 4 | |
| 39 | 3 | d5 |
| 40 | 4 | |
| 41 | 3 | d6 |
| 42 | 4 | |
| 43 | 3 | d7 |
| 44 | 4 | |
| 45 | 4 | |
| 46 | 3 | |
| 47 | 4 | |
| 48 | 4 | |
| 49 | 4 | |
| 50 | 4 | |
| 51 | 4 | |
| 52 | 4 | e1 } E |
| 53 | 5 | |
| 54 | 4 | e2 |
| 55 | 5 | |
| 56 | 5 | |
| 57 | 5 | |
| 58 | 5 | |
| 59 | 5 | |
| 60 | 6 | |

Fig. 11

FREQUENCY-DIVIDING-NUMBER TABLE (X2)

| DOT CLOCK NUMBER | MASTER CLOCK FREQUENCY DIVIDING NUMBER | | |
|---|---|---|---|
| 1 | 5 | } a1 | } A |
| 2 | 6 | | |
| 3 | 5 | } a2 | |
| 4 | 6 | | |
| 5 | 5 | } b1 | } B |
| 6 | 4 | | |
| 7 | 5 | } b2 | |
| 8 | 4 | | |
| 9 | 4 | | |
| 10 | 4 | | |
| 11 | 4 | | |
| 12 | 4 | | |
| 13 | 4 | | |
| 14 | 4 | | |
| 15 | 4 | | |
| 16 | 3 | | |
| 17 | 4 | | |
| 18 | 3 | } c1 | } C |
| 19 | 4 | | |
| 20 | 3 | } c2 | |
| 21 | 4 | | |
| 22 | 3 | } c3 | |
| 23 | 4 | | |
| 24 | 3 | } c4 | |
| 25 | 4 | | |
| 26 | 3 | } c5 | |
| 27 | 4 | | |
| 28 | 4 | | |
| 29 | 3 | | |
| 30 | 4 | | |

| DOT CLOCK NUMBER | MASTER CLOCK FREQUENCY DIVIDING NUMBER | | |
|---|---|---|---|
| 31 | 4 | } d1 | } D |
| 32 | 3 | | |
| 33 | 4 | } d2 | |
| 34 | 3 | | |
| 35 | 4 | } d3 | |
| 36 | 3 | | |
| 37 | 4 | } d4 | |
| 38 | 3 | | |
| 39 | 4 | } d5 | |
| 40 | 3 | | |
| 41 | 4 | } d6 | |
| 42 | 3 | | |
| 43 | 4 | } d7 | |
| 44 | 3 | | |
| 45 | 4 | | |
| 46 | 3 | | |
| 47 | 4 | | |
| 48 | 4 | | |
| 49 | 4 | | |
| 50 | 4 | | |
| 51 | 4 | | |
| 52 | 5 | } e1 | } E |
| 53 | 4 | | |
| 54 | 5 | } e2 | |
| 55 | 4 | | |
| 56 | 5 | | |
| 57 | 5 | | |
| 58 | 5 | | |
| 59 | 5 | | |
| 60 | 6 | | |

Fig. 12

| HORIZONTAL SCANNING NUMBER | TABLE NUMBER | HORIZONTAL SCANNING NUMBER | TABLE NUMBER |
|---|---|---|---|
| 1 | X1 | 16 | X2 |
| 2 | X2 | 17 | X1 |
| 3 | X1 | 18 | X2 |
| 4 | X2 | 19 | X1 |
| 5 | X1 | 20 | X2 |
| 6 | X2 | 21 | X1 |
| 7 | X1 | 22 | X2 |
| 8 | X2 | 23 | X1 |
| 9 | X1 | 24 | X2 |
| 10 | X2 | 25 | X1 |
| 11 | X1 | 26 | X2 |
| 12 | X2 | 27 | X1 |
| 13 | X1 | 28 | X2 |
| 14 | X2 | 29 | X1 |
| 15 | X1 | 30 | X2 |

Fig. 13

| FRAME NUMBER | TABLE NUMBER | FRAME NUMBER | TABLE NUMBER |
|---|---|---|---|
| 1 | X1 | 6 | X2 |
| 2 | X2 | 7 | X1 |
| 3 | X1 | 8 | X2 |
| 4 | X2 | 9 | X1 |
| 5 | X1 | 10 | X2 |

Fig. 14A

| HORIZONTAL SCANNING NUMBER | TABLE NUMBER | HORIZONTAL SCANNING NUMBER | TABLE NUMBER |
|---|---|---|---|
| 1 | X2 | 16 | X1 |
| 2 | X2 | 17 | X1 |
| 3 | X2 | 18 | X1 |
| 4 | X2 | 19 | X1 |
| 5 | X2 | 20 | X1 |
| 6 | X2 | 21 | X1 |
| 7 | X2 | 22 | X1 |
| 8 | X2 | 23 | X1 |
| 9 | X2 | 24 | X1 |
| 10 | X2 | 25 | X1 |
| 11 | X1 | 26 | X1 |
| 12 | X1 | 27 | X1 |
| 13 | X1 | 28 | X1 |
| 14 | X1 | 29 | X1 |
| 15 | X1 | 30 | X1 |

Fig. 14B

| HORIZONTAL SCANNING NUMBER | TABLE NUMBER | HORIZONTAL SCANNING NUMBER | TABLE NUMBER |
|---|---|---|---|
| 1 | X1 | 16 | X2 |
| 2 | X1 | 17 | X2 |
| 3 | X1 | 18 | X2 |
| 4 | X1 | 19 | X2 |
| 5 | X1 | 20 | X2 |
| 6 | X1 | 21 | X1 |
| 7 | X1 | 22 | X1 |
| 8 | X1 | 23 | X1 |
| 9 | X1 | 24 | X1 |
| 10 | X1 | 25 | X1 |
| 11 | X2 | 26 | X1 |
| 12 | X2 | 27 | X1 |
| 13 | X2 | 28 | X1 |
| 14 | X2 | 29 | X1 |
| 15 | X2 | 30 | X1 |

Fig. 14C

| HORIZONTAL SCANNING NUMBER | TABLE NUMBER | HORIZONTAL SCANNING NUMBER | TABLE NUMBER |
|---|---|---|---|
| 1 | X1 | 16 | X1 |
| 2 | X1 | 17 | X1 |
| 3 | X1 | 18 | X1 |
| 4 | X1 | 19 | X1 |
| 5 | X1 | 20 | X1 |
| 6 | X1 | 21 | X2 |
| 7 | X1 | 22 | X2 |
| 8 | X1 | 23 | X2 |
| 9 | X1 | 24 | X2 |
| 10 | X1 | 25 | X2 |
| 11 | X1 | 26 | X2 |
| 12 | X1 | 27 | X2 |
| 13 | X1 | 28 | X2 |
| 14 | X1 | 29 | X2 |
| 15 | X1 | 30 | X2 |

Fig. 15

LOOKUP TABLE
(BRIGHTNESS TABLE)

| DOT CLOCK NUMBER | BRIGHTNESS CORRECTION RATE | DOT CLOCK NUMBER | BRIGHTNESS CORRECTION RATE |
|---|---|---|---|
| 1 | 1.000 | 31 | 1.701 |
| 2 | 1.001 | 32 | 1.603 |
| 3 | 1.002 | 33 | 1.523 |
| 4 | 1.005 | 34 | 1.456 |
| 5 | 1.008 | 35 | 1.399 |
| 6 | 1.012 | 36 | 1.35 |
| 7 | 1.016 | 37 | 1.308 |
| 8 | 1.022 | 38 | 1.271 |
| 9 | 1.028 | 39 | 1.238 |
| 10 | 1.036 | 40 | 1.209 |
| 11 | 1.044 | 41 | 1.183 |
| 12 | 1.054 | 42 | 1.16 |
| 13 | 1.065 | 43 | 1.14 |
| 14 | 1.076 | 44 | 1.121 |
| 15 | 1.090 | 45 | 1.105 |
| 16 | 1.105 | 46 | 1.09 |
| 17 | 1.121 | 47 | 1.076 |
| 18 | 1.140 | 48 | 1.065 |
| 19 | 1.160 | 49 | 1.054 |
| 20 | 1.183 | 50 | 1.044 |
| 21 | 1.209 | 51 | 1.036 |
| 22 | 1.238 | 52 | 1.028 |
| 23 | 1.271 | 53 | 1.022 |
| 24 | 1.308 | 54 | 1.016 |
| 25 | 1.350 | 55 | 1.012 |
| 26 | 1.399 | 56 | 1.008 |
| 27 | 1.456 | 57 | 1.005 |
| 28 | 1.523 | 58 | 1.002 |
| 29 | 1.603 | 59 | 1.001 |
| 30 | 1.701 | 60 | 1 |

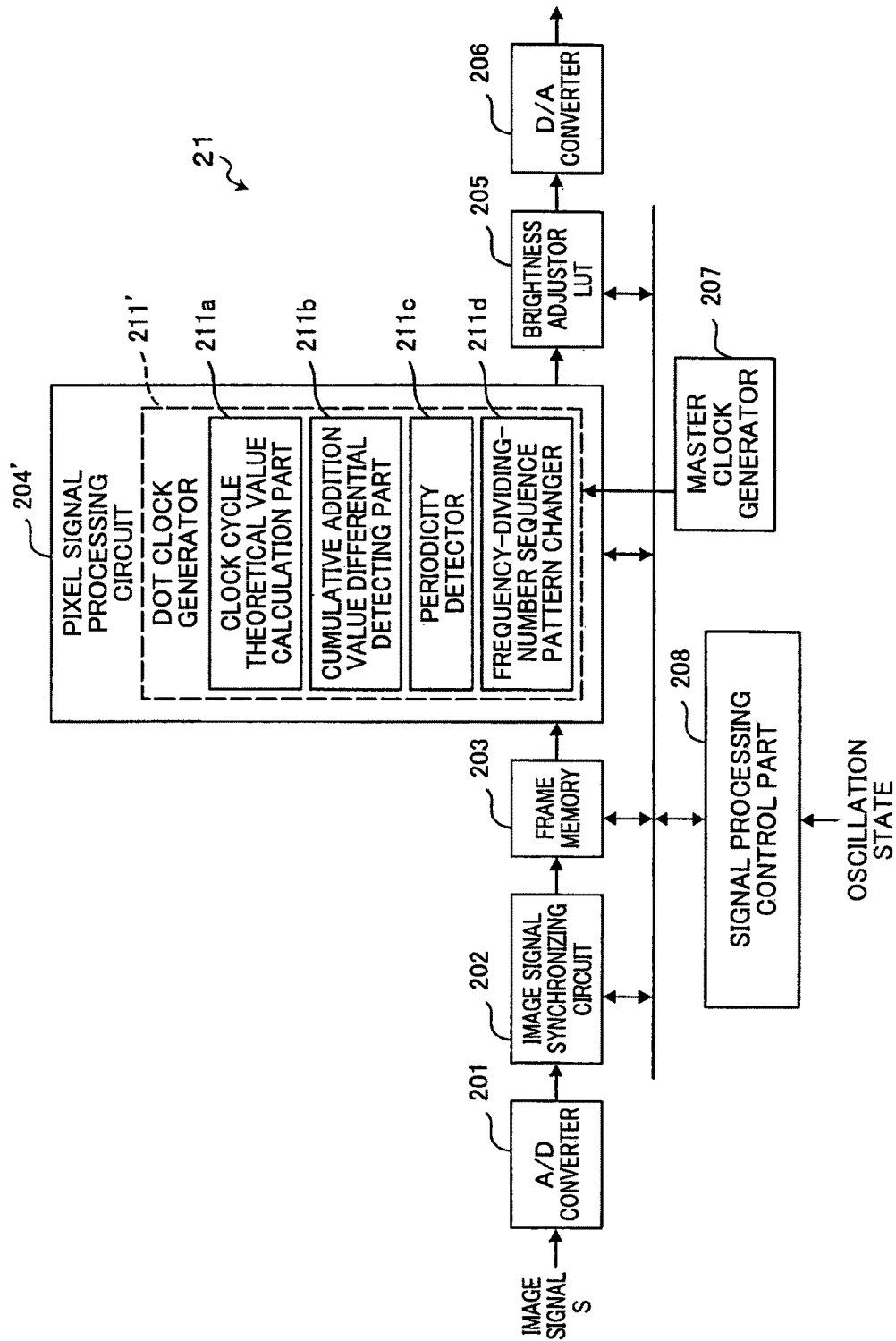

OPTICAL SCANNING DEVICE, IMAGE DISPLAY DEVICE AND RETINAL SCANNING DISPLAY PROVIDED WITH OPTICAL SCANNING DEVICE

CROSS-REFERENCE TO RELATED APPLICATIONS

The present application is a Continuation-in-Part of International Application PCT/JP2008/054982 filed on Mar. 18, 2008, which claims the benefits of Japanese Patent Application No. 2007-073406 filed on Mar. 20, 2007.

BACKGROUND

1. Field

The present invention relates to an optical scanning device, and more particularly to an optical scanning device which scans a radiated optical flux by making use of predetermined oscillations of a resonance-type deflection element, an image display device provided with the optical scanning device and a retinal scanning display provided with the optical scanning device.

2. Description of the Related Art

With respect to an optical scanning device which constitutes a laser printer, an image display device or the like, in the related art, there has been known an optical scanning device which uses a resonance-type deflection element capable of scanning an optical flux by making use of oscillations.

For example, JP-A-2005-181477 (patent document 1) discloses an image display device capable of performing scanning on an optical flux radiated from a light source in a high-speed scanning direction (horizontal direction) using a resonance-type deflection element. The optical flux scanned by the resonance-type deflection element is scanned by a deflection element arranged in a succeeding stage in a low-speed scanning direction (vertical direction), and is projected on a retina of an eye thus forming an image on the retina.

Here, it is necessary for this type of optical scanning device to scan optical fluxes such that positions of the optical fluxes (scanning positions) corresponding to respective pixels (dots) in the scanning direction of the optical fluxes are arranged at equal intervals. However, when the resonance-type deflection element is used as a scanning element, in radiating the optical fluxes of the respective pixels at equal time intervals, the positions of the optical fluxes after scanning respective pixels are arranged at non-equal intervals in a sinusoidal shape.

In view of the above, in the related art, the optical fluxes of the respective pixels which are arranged at non-equal intervals by scanning using the resonance-type deflection element are optically corrected by an arcsin θ correction lens. Here, "pixel" in this specification indicates a minimum unit of an image signal and, more particularly, indicates a minimum unit of a digitalized image signal. That is, out of image signals, the image signal which is read corresponding to each dot is referred to as a pixel (a pixel signal).

However, the optical correction in the related art using the arcsin θ correction lens requires an expensive optical system thus pushing up a cost of an optical scanning device, and has a disadvantage that it is impossible to miniaturize the optical scanning device. To overcome such drawbacks, there has been known a method which constitutes an optical scanning device without using the arcsin θ correction lens. That is, this method uses clocks for pixel scanning (dot clocks) as cycles corresponding to the optical scanning directions.

JP-B-5-3947 (patent document 2) discloses an optical scanning device which includes an oscillator which generates master clocks, and a first frequency divider which generates position control clocks by dividing the master clocks, wherein dot clocks are generated based on the position control clocks, and the dot clocks are changed corresponding to scanning speeds of a resonance-type deflection element.

However, in the optical scanning device disclosed in patent document 2, since the dot clocks are changed corresponding to the scanning speeds of the resonance-type deflection element, the optical fluxes are scanned such that the scanning positions of the respective pixels are arranged at equal intervals. However, in the optical scanning device disclosed in patent document 2, the intensities of optical fluxes radiated for respective pixels in response to the dot clocks are not changed.

In view of the above, in Japanese Patent Application 2006-114713, the inventor of the present invention proposed a technique which allows an optical scanning device to maintain quality of an image without using an arcsin θ correction lens.

SUMMARY

However, in the above-mentioned technique which changes the dot clocks corresponding to scanning speeds of the resonance-type deflection element, there arises a following case. That is, on one scanning line, a dot clock group consisting of a plurality of dot clock sets in each of which a frequency-dividing-number sequence pattern of the dot clock set consisting of two or more continuous dot clocks is repeated plural times is generated. For example, the dot clock set in which the frequency dividing numbers based on the master clocks corresponding to two continuous dot clocks become "6", "5" respectively is repeated plural times so that the dot clock group of "6, 5, 6, 5, . . . " is generated.

When a still image having a predetermined pixel pattern (a pixel pattern which repeats white and black, for example) is displayed in a state that a dot clock group in which the same frequency-dividing-number sequence pattern is repeated plural times on one scanning line is generated, there exists a possibility that a stripe pattern appears in a viewing image.

Accordingly, it is an object of the present invention to provide an optical scanning device which can, even when an image having a predetermined pattern is displayed, suppress the appearance of a stripe pattern in the image thus keeping quality of the image, an image display device which includes such an optical scanning device, and a retinal scanning display provided with such an optical scanning device.

According to one aspect of the present invention, there is provided an optical scanning device which includes: an optical flux generator which is configured to generate an optical flux in response to an image signal read for every dot clock and to radiate the optical flux; a resonance-type deflection element which has a deflection surface for scanning the optical flux; a drive signal generator which is configured to generate a drive signal for oscillating the resonance-type deflection element in a resonance state; and a dot clock generator which is configured to generate dot clocks by dividing master clocks which constitute basic clocks with a frequency dividing number corresponding to a scanning position. The dot clock generator is configured to, with respect to a group of dot clocks which is formed of plural sets of dot clocks in which a frequency-dividing-number sequence pattern of the set of dot clocks each of which is constituted of two or more continuous dot clocks is repeated plural times on one scanning line, change the frequency-dividing-number sequence pattern of each set of dot clocks while maintaining a total value of frequency dividing numbers necessary for generating each set of dot clocks at a constant value.

According to another aspect of the present invention, there is provided an image display device having an optical scanning device and being configured to display an image by scanning an optical flux which is modulated in response to an image signal by the optical scanning device. The optical scanning device includes: an optical flux generator which is configured to generate an optical flux in response to an image signal read for every dot clock and radiates the optical flux; a resonance-type deflection element which has a deflection surface for scanning the optical flux; a drive signal generator which is configured to generate a drive signal for oscillating the resonance-type deflection element in a resonance state; and a dot clock generator which is configured to generate dot clocks by dividing master clocks which constitute basic clocks with a frequency dividing number corresponding to a scanning position. The dot clock generator is configured to, with respect to a group of dot clocks which is formed of plural sets of dot clocks in which a frequency-dividing-number sequence pattern of the set of dot clocks each of which is constituted of two or more continuous dot clocks is repeated plural times on one scanning line, change the frequency-dividing-number sequence pattern of each set of dot clocks while maintaining a total value of frequency dividing numbers necessary for generating each set of dot clocks at a constant value.

According to still another aspect of the present invention, there is provided a retinal scanning display having an optical scanning device and being configured to perform a projection display of an image on a retina of an eye by scanning an optical flux which is modulated in response to an image signal by the optical scanning device. The optical scanning device includes: an optical flux generator which is configured to generate an optical flux in response to an image signal read for every dot clock and radiates the optical flux; a resonance-type deflection element which has a deflection surface for scanning the optical flux; a drive signal generator which is configured to generate a drive signal for oscillating the resonance-type deflection element in a resonance state; and a dot clock generator which is configured to generate dot clocks by dividing master clocks which constitute basic clocks with a frequency dividing number corresponding to a scanning position. The dot clock generator is configured to, with respect to a group of dot clocks which is formed of plural sets of dot clocks in which a frequency-dividing-number sequence pattern of the set of dot clocks each of which is constituted of two or more continuous dot clocks is repeated plural times on one scanning line, change the frequency-dividing-number sequence pattern of each set of dot clocks while maintaining a total value of frequency dividing numbers necessary for generating each set of dot clocks at a constant value.

BRIEF DESCRIPTION OF THE DRAWINGS

FIG. 6 is a table showing an example of a frequency-dividing-number table;

FIG. 8 is a view for explaining a method for forming a frequency-dividing-number table;

FIG. 9 is a view for explaining periodicity of sets of dot clocks each of which is constituted of two or more continuous dot clocks;

FIG. 11 is a view showing an example of a frequency-diving number table in which a clock cycle of each dot clock of periodical set of dot clocks is changed;

FIG. 12 is a view for explaining a modification of frequency-dividing-number sequence pattern;

FIG. 13 is a view for explaining another modification of frequency-dividing-number sequence pattern;

FIG. 14A to FIG. 14C are views for explaining still another modification of frequency-dividing number sequence pattern;

FIG. 15 is a view showing an example of a lookup table; and

FIG. 16 is a view showing the constitution of a part of a signal processing circuit according to a second embodiment.

DESCRIPTION OF THE PREFERRED EMBODIMENTS

Hereinafter, the preferred embodiments according to the present invention are explained in conjunction with drawings. In the embodiments which are described hereinafter, a case in which the present invention is applied to a retinal scanning display is explained.

First Embodiment

[1. Explanation of Whole Image Display Device 1]

Figure 1:
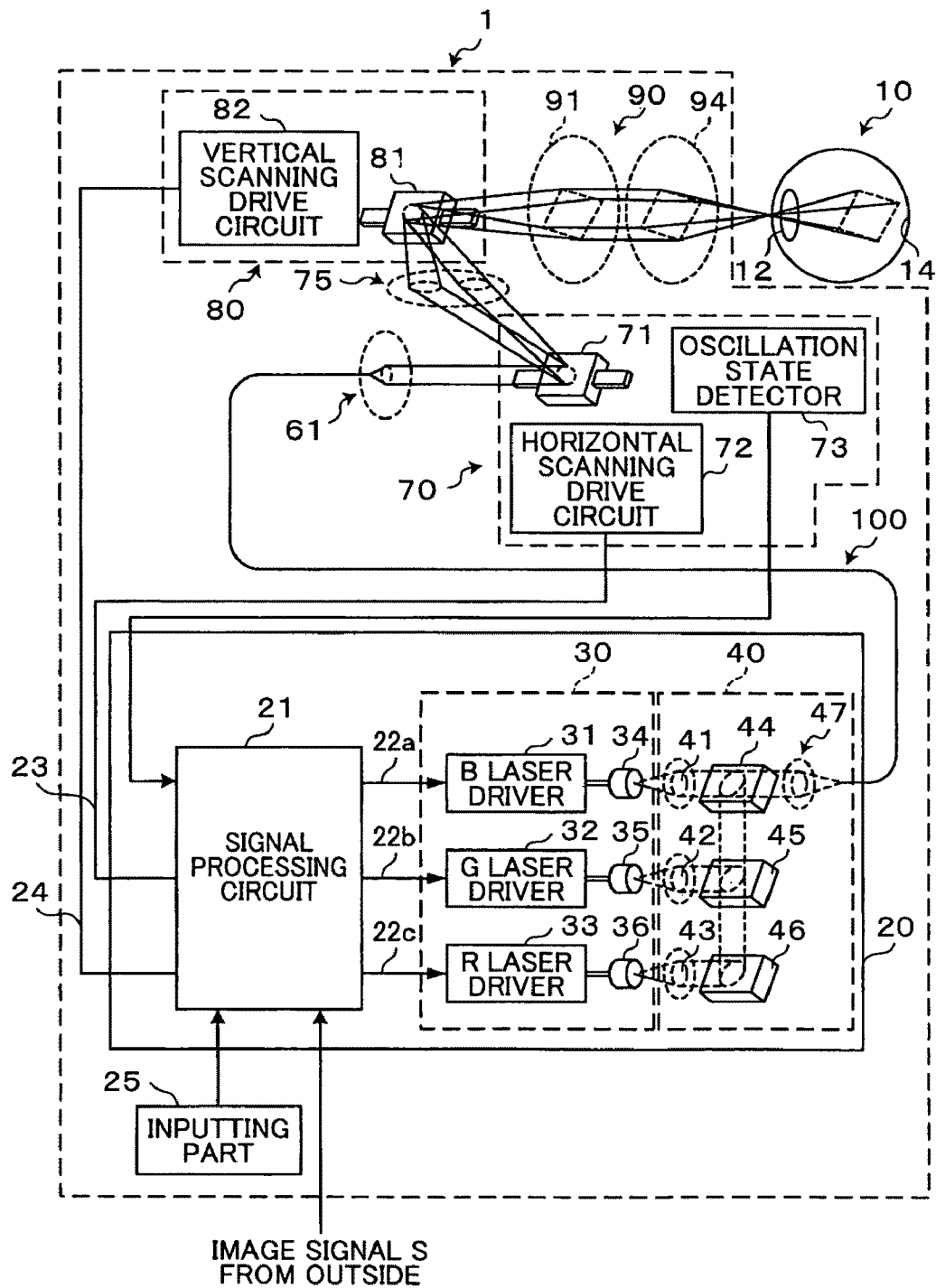
FIG. 1 is a view showing the whole constitution of an image display device according to a first embodiment.

First of all, the whole constitution of an image display device 1 and the manner of operation of the image display device 1 are explained in conjunction with FIG. 1. The image display device 1 is configured such that an optical flux is made incident on a pupil 12 of a viewer who is a user of the image display device 1 so as to project an image on his/her retina 14 thus allowing the viewer to view a virtual image in front of the pupil 12 of a viewer's eye 10. This device 1 is also referred to as a retinal scanning display.

The image display device 1 includes an optical flux generator 20 which reads an image signal S supplied from the outside for every dot clock, generates an optical flux whose intensity is modulated in response to the read image signal and radiates the optical flux. Further, the image display device 1 includes, between the optical flux generator 20 and the viewer's eye 10, a collimation optical system 61 which collimates laser beams (hereinafter, referred to as "optical flux") generated by the optical flux generator 20 and radiated via an optical fiber 100, a horizontal scanning part 70 which scans the optical flux collimated by the collimation optical system 61 in a horizontal direction (primary direction) for an image display, a vertical scanning part 80 which scans the optical flux scanned in the horizontal direction using the horizontal scanning part 70 in the vertical direction (secondary direction), a relay optical system 75 which is formed between the horizontal scanning part 70 and the vertical scanning part 80, and a relay optical system 90 which radiates the optical fluxes scanned in the horizontal direction as well as in the vertical direction in this manner (hereinafter, referred to as "scanned optical flux") on the pupil 12.

Further, the image display device 1 includes an inputting part 25 which functions as a table changeover instruction unit for changing over a frequency-dividing-number table and a lookup table which are described later. The inputting part 25 is constituted of a table changeover button or the like.

As shown in FIG. 1, the optical flux generator 20 includes a signal processing circuit 21 to which an image signal S supplied from the outside is inputted and which generates respective signals or the like constituting components for synthesizing an image in response to the image signal S. In the signal processing circuit 21, respective image signals 22a to 22c of blue (B), green (G) and red (R) are generated and are outputted. Further, the signal processing circuit 21 outputs a horizontal synchronizing signal 23 used in the horizontal scanning part 70 and a vertical synchronizing signal 24 used in the vertical scanning part 80 respectively.

Further, the optical flux generator 20 includes a light source part 30 for forming three image signals (B, G, R) 22a to 22c outputted from the signal processing circuit 21 for every dot clock into optical fluxes respectively, and an optical synthesizing part 40 for generating an arbitrary optical flux by combining these three optical fluxes into one optical flux.

The light source part 30 includes a B laser 34 for generating a blue optical flux and a B laser driver 31 for driving the B laser 34, a G laser 35 for generating a green optical flux and a G laser driver 32 for driving the G laser 35, and an R laser 36 for generating a red optical flux and an R laser driver 33 for driving the R laser 36.

The optical synthesizing part 40 includes collimation optical systems 41, 42, 43 provided for collimating the optical fluxes incident from the light source part 30, dichroic mirrors 44, 45, 46 provided for synthesizing the collimated optical fluxes, and a coupling optical system 47 for guiding a synthesized optical flux into an optical fiber 100.

The laser beams radiated from the respective lasers 34, 35, 36 are, after respectively being collimated by the collimation optical systems 41, 42, 43, incident on the dichroic mirrors 44, 45, 46. Thereafter, the respective optical fluxes are reflected on the dichroic mirrors 44, 45, 46 or are allowed to pass through the dichroic mirrors 44, 45, 46 selectively with respect to predetermined wavelengths thereof.

To be specific, the blue optical flux radiated from the B laser 34 is, after being collimated by the collimation optical system 41, incident on the dichroic mirror 44. The green optical flux radiated from the G laser 35 is incident on the dichroic mirror 45 via the collimation optical system 42. The red optical flux radiated from the R laser 36 is incident on the dichroic mirror 46 via the collimation optical system 43.

The optical fluxes of three primary colors which are respectively incident on these three dichroic mirrors 44, 45, 46, selectively corresponding to wavelengths thereof, are reflected on the dichroic mirrors 44, 45, 46 or are allowed to pass through the dichroic mirrors 44, 45, 46, are synthesized, arrive at the coupling optical system 47, and are converged. Then, the converged optical fluxes are guided into the optical fiber 100.

The horizontal scanning part 70 and the vertical scanning part 80, to bring the optical fluxes incident from the optical fiber 100 into a state which allows the optical fluxes to be projected as an image, scan the optical fluxes in the horizontal direction as well as in the vertical direction to form the optical fluxes into scanned optical fluxes.

The horizontal scanning part 70 includes a resonance-type deflection element 71 having a deflection surface for scanning the optical fluxes in the horizontal direction, a horizontal scanning drive circuit 72 as a drive signal generator which generates a drive signal for allowing the resonance-type deflection element 71 to resonate so as to oscillate deflection surface (scanning surface) of the resonance-type deflection element 71, and an oscillation state detector 73 which detects the oscillation state such as the swing range and oscillation frequency of the deflection surface of the resonance-type deflection element 71 in response to a displacement signal outputted from the resonance-type deflection element 71. Here, the horizontal scanning part 70, the optical flux generator 20, the optical fiber 100 and the collimation optical system 61 constitute one example of the optical scanning device.

The vertical scanning part 80 includes a deflection element 81 for scanning the optical fluxes in the vertical direction, and a vertical scanning drive circuit 82 which drives the deflection element 81.

Here, the horizontal scanning drive circuit 72 and the vertical scanning drive circuit 82 respectively drive the resonance-type deflection element 71 and the deflection element 81 in response to a horizontal synchronizing signal 23 and a vertical synchronizing signal 24 which are outputted from the signal processing circuit 21.

Further, the image display device 1 includes a relay optical system 75 which relays the optical fluxes between the horizontal scanning part 70 and the vertical scanning part 80. Light which is scanned in the horizontal direction using the resonance-type deflection element 71 passes through the relay optical system 75, is scanned by the deflection element 81 in the vertical direction, and is radiated on the relay optical system 90 as the scanned optical fluxes.

Figure 2A:
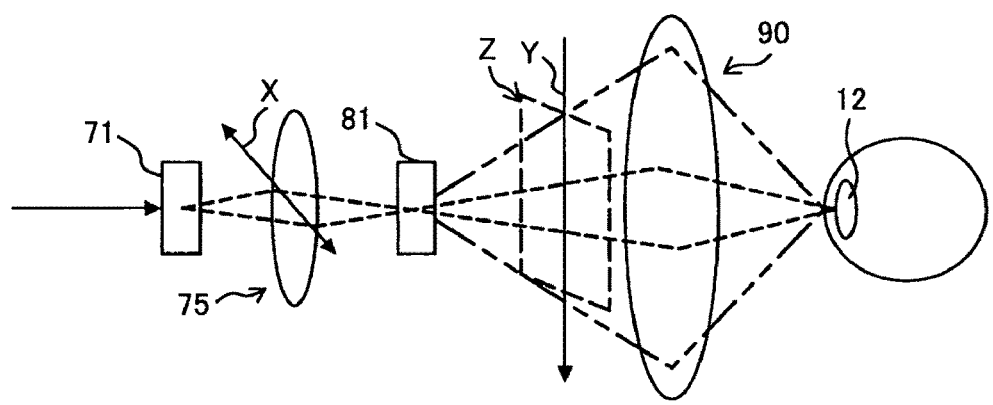
FIG. 2A and FIG. 2B are views for explaining scanning of an optical flux by a scanning part.

That is, as shown in FIG. 2A, the resonance-type deflection element 71 which performs the relatively high-speed oscillation is resonated and oscillated by the horizontal scanning drive circuit 72, and performs reciprocating scanning of the incident optical flux with respect to the horizontal direction X. Then, the scanned light which is scanned in the horizontal direction by the resonance-type deflection element 71 is incident on the vertical scanning part 80 via the relay optical system 75. The deflection element 81 of the vertical scanning part 80 is oscillated in a sawtooth waveform by the vertical scanning drive circuit 82, and performs scanning of the incident optical flux with respect to the vertical direction Y. The scanned optical flux with a scanning range Z which is scanned in the vertical direction by the deflection element 81 is incident on a pupil 12 of a user via the relay optical system 90.

Figure 2B:
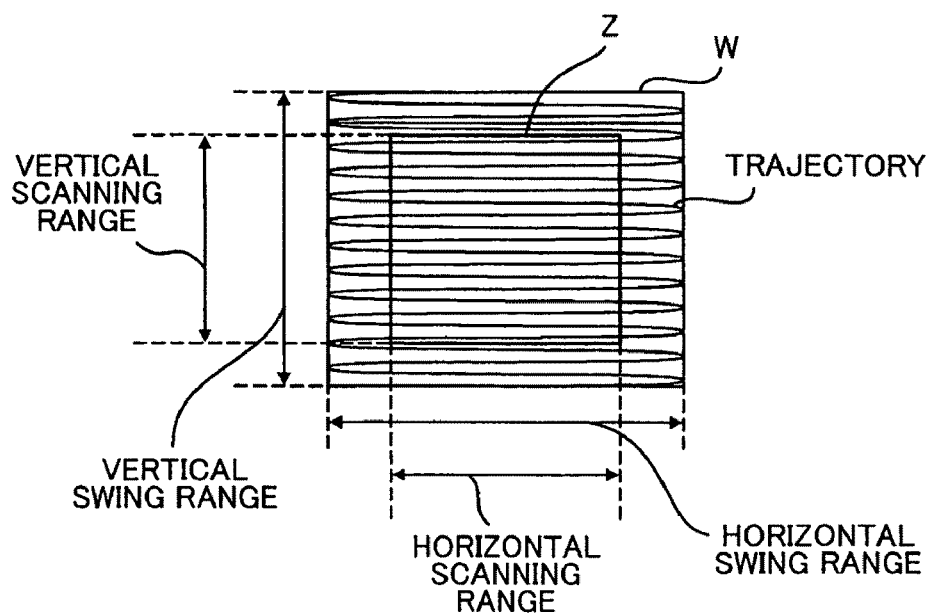

FIG. 2B shows the relationship between a swing range W (a horizontal swing range and a vertical swing range) and the scanning range Z (a horizontal scanning range and a vertical scanning range) of the resonance-type deflection element 71 and the deflection element 81. Within the swing range W of the resonance-type deflection element 71 and the deflection element 81, due to the radiation of optical flux from the optical flux generator 20 at timing of the scanning range Z, the optical flux is scanned by the horizontal scanning part 70 and the vertical scanning part 80 within the scanning range Z. Accordingly, the optical flux for 1 frame is scanned. This scanning is repeated for every image of 1 frame.

The relay optical system 90 includes, as shown in FIG. 1, lens systems 91, 94 having a positive refracting power. The scanned optical fluxes radiated from the vertical scanning part 80, using the lens system 91, have center lines thereof respectively arranged parallel to each other and are respectively converted into converged optical fluxes. Then, using the lens system 94, the converged optical fluxes are arranged substantially parallel to each other and, at the same time, are converted such that the center lines of these optical fluxes are converged on the pupil 12 of the viewer.

Here, for detecting the swing position of the deflection surface of the resonance-type deflection element 71 in the horizontal scanning part 70, the optical flux generator 20 generates the horizontal synchronizing signal 23 and the vertical synchronizing signal 24 and the like and, at the same time, determines optical flux radiation start timing and the like based on a swing state of the resonance-type deflection element 71, and radiates the optical flux.

Further, in this embodiment, the optical flux incident from the optical fiber 100 is scanned in the horizontal direction by the horizontal scanning part 70 and, thereafter, is scanned in the vertical direction by the vertical scanning part 80. However, the arrangement of the horizontal scanning part 70 and the vertical scanning part 80 may be exchanged. That is, the optical flux may be scanned in the vertical direction by the vertical scanning part 80 and, thereafter, may be scanned in the horizontal direction by the horizontal scanning part 70.

[2. Explanation of Resonance-Type Deflection Element 71]

Next, the constitution of the resonance-type deflection element 71 for scanning the optical flux in the horizontal direction as described above is specifically explained hereinafter.

Figure 3:
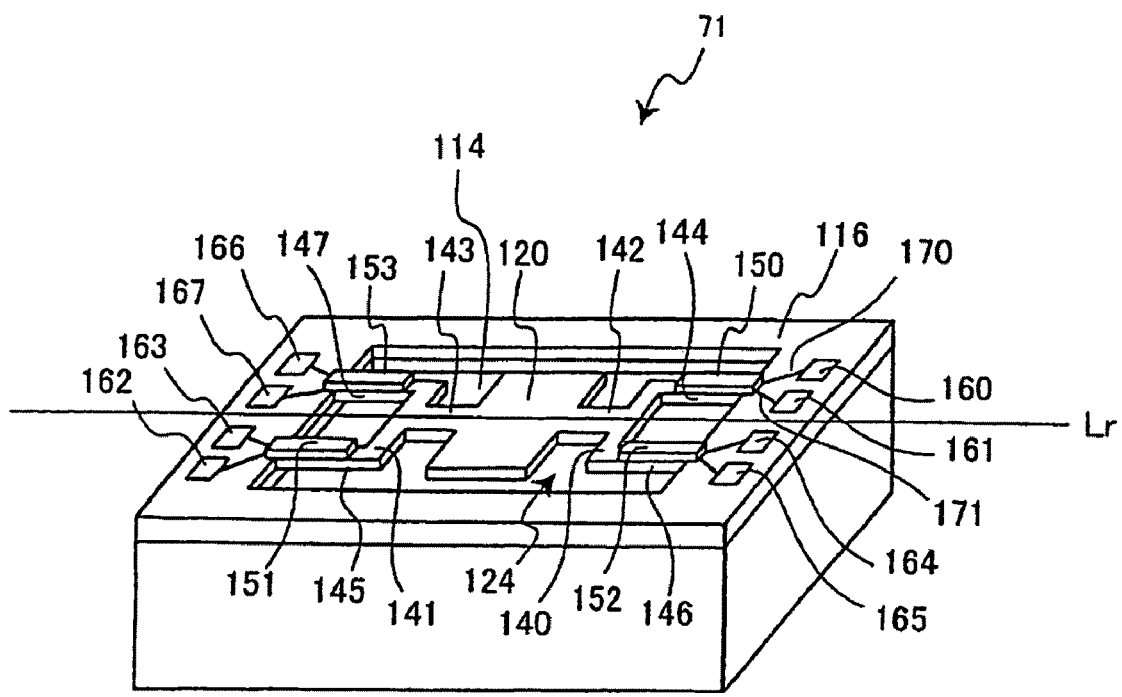
FIG. 3 is a perspective view showing an assembling state of a resonance-type deflection element shown in FIG. 1.

The resonance-type deflection element 71 is an optical scanner of a resonance type. For scanning the light spot on the retina 14 in the horizontal direction, the resonance-type deflection element 71 oscillates an oscillating body 124 which includes a deflection surface 120. The deflection surface 120 constitutes a reflection mirror which changes the radiation direction of the optical flux about an oscillation axis Lr extending in the lateral direction in FIG. 3 by reflecting the optical flux. In this embodiment, the oscillating body 124 is configured to be resonate. Due to such resonance of the oscillating body 124, it is possible to oscillate the deflection surface 120.

The oscillating body 124 is an integral body formed of a plurality of constitutional elements. That is, the oscillating body 124 is formed of the deflection surface 120, a first beam portion 140 which is constituted of a plate-shaped resilient member 142 connected to one side of the deflection surface 120, resilient members 144, 146, and a second beam portion 141 which is constituted of a plate-shaped resilient member 143, resilient members 145, and 147 connected to the other side of the deflection surface 120.

A first piezoelectric element 150 and a second piezoelectric element 152 are respectively fixedly secured to one-side surfaces of the resilient members 144,146 which form portions of the first beam portion 140. The first piezoelectric element 150 and the second piezoelectric element 152 respectively have one ends thereof fixedly secured to the fixed frame body 116 as fixed ends, and the other ends thereof formed as free ends which are not fixedly secured to the fixed frame body 116. Here, a first piezoelectric element portion is constituted of the first piezoelectric element 150 and the second piezoelectric element 152.

The first piezoelectric element 150 and the second piezoelectric element 152 have the same structure in which a piezoelectric body is sandwiched by an upper electrode and a lower electrode in the direction perpendicular to fixed surfaces of the first piezoelectric element 150 and the second piezoelectric element 152. Further, the upper electrode and the lower electrode of the first piezoelectric element 150 are respectively connected to an input terminal 160 and an input terminal 161 which are mounted on the fixed frame body 116 using lead lines 170, 171. The upper electrode and the lower electrode of the second piezoelectric element 152 are respectively connected to an input terminal 164 and an input terminal 165 which are mounted on the fixed frame body 116 respectively using lead lines.

In the resonance-type deflection element 71 having the above-mentioned constitution, by applying AC voltages of phases opposite to each other between the upper electrode and the lower electrode of the first piezoelectric element 150 and the upper electrode and the lower electrode of the second piezoelectric element 152, respective free ends of the first piezoelectric element 150 and the second piezoelectric element 152 are resiliently deformed and are bent such that the respective free ends are displaced in the directions opposite to each other thus repeating vertical bending oscillation at AC voltage frequency. The bending oscillation is, by way of the first beam portion 140, converted into a rotational movement about the oscillation axis Lr which constitutes the center axis, and the deflection surface 120 is, as shown in FIG. 4, rotated about the oscillation axis Lr.

Further, the second beam portion 141 is positioned on the other side of the deflection surface 120 as described above and is formed symmetrically with the first beam portion 140 with respect to the oscillation axis Lr, and the rotational oscillations generated by the first beam portion 140 as described above are transmitted to the second beam portion 141 by way of the deflection surface 120. As a result, the displacements similar to the displacements of the first beam portion 140 are generated on the second beam portion 141. That is, about the oscillation axis Lr which constitutes the center axis, the resilient member 143 is resiliently deformed and is rotationally oscillated in the approximately same manner as the resilient member 142. The resilient member 145 is resiliently deformed and generates the bending oscillations in the approximately same manner as the resilient member 146 about the oscillation axis Lr which constitutes the center axis. The resilient member 147 is resiliently deformed and generates the bending oscillations in the approximately same manner as the resilient member 144 about the oscillation axis Lr which constitutes the center axis.

Figure 4:
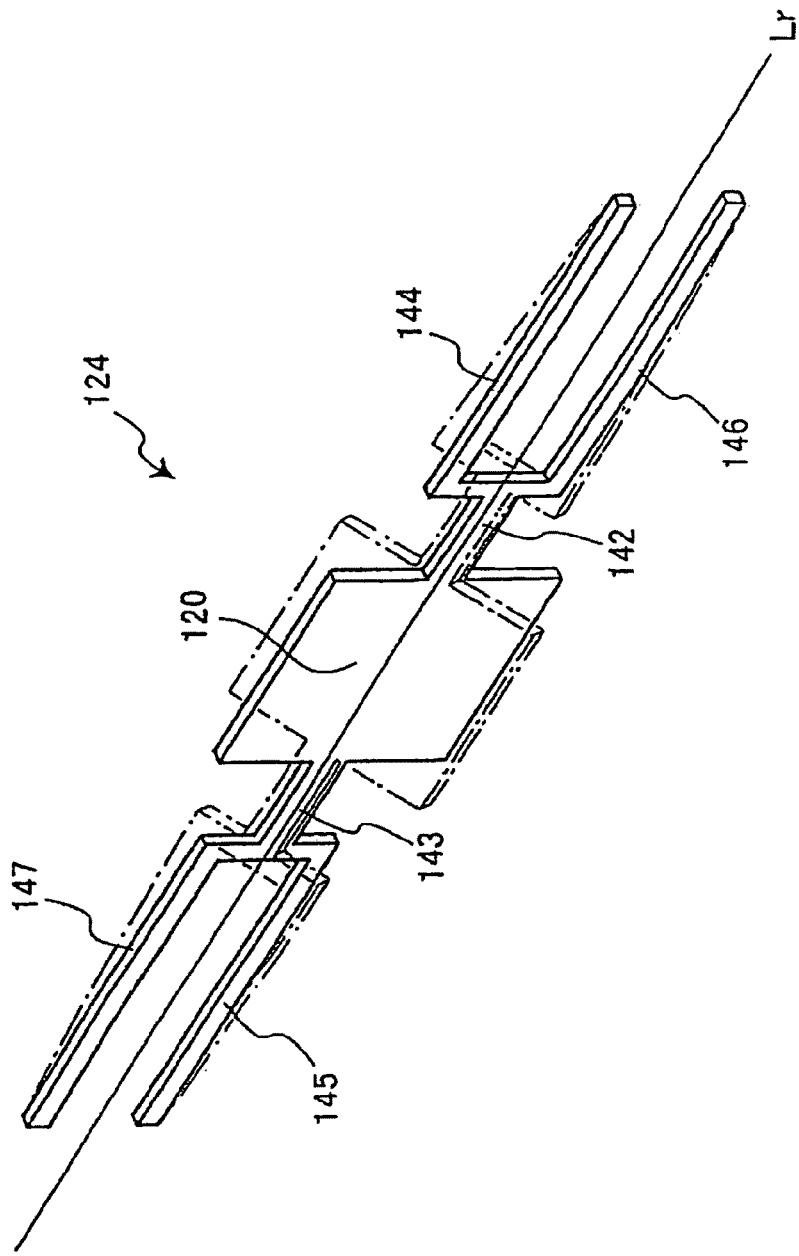
FIG. 4 is a view for explaining rotational oscillation of an oscillation body.

In FIG. 4, a solid line indicates positions of the first beam portion 140, the second beam portion 141 and the deflection surface 120 when a voltage is not applied to the first piezoelectric element 150 and the second piezoelectric element 152. On the other hand, a broken line indicates positions of the first beam portion 140, the second beam portion 141 and the deflection surface 120 corresponding to a certain voltage when an AC voltage is applied to the first piezoelectric element 150 and the second piezoelectric element 152.

Here, the fourth piezoelectric element 153 is fixedly secured to the resilient member 147 of the second beam portion 141. When such bending oscillations as described above are generated in the resilient member 147, the bending oscillations are converted into a voltage by the fourth piezoelectric element 153 and a voltage signal corresponding to a twisting quantity of the resilient member 147 (hereinafter referred to as "displacement signal Swsig(+)") is outputted from the output terminals 166, 167. In the same manner, the third piezoelectric element 151 is fixedly secured to the resilient member 145 of the second beam portion 141. When such bending oscillations as described above are generated in the resilient member 145, the bending oscillations are converted into a voltage by the third piezoelectric element 151 and a voltage signal corresponding to a twisting quantity of the resilient member 145 (hereinafter referred to as "displacement signal Swsig(−)") is outputted from the output terminals 162, 163. Here, a second piezoelectric element portion is constituted of the third piezoelectric element 151 and the fourth piezoelectric element 153. Further, a displacement signal generator is constituted of the second piezoelectric element portion and the above-mentioned second beam portion 141.

With the use of the third piezoelectric element 151 and the fourth piezoelectric element 153 in this manner, the displacement signal corresponding to the twisting quantity of the second beam portion 141 can be generated and hence, a light beam detector which detects the displacements of the deflection surface 120 becomes unnecessary whereby it is possible to miniaturize the device. That is, the displacement signals indicative of oscillation displacement of the deflection surface 120 of the resonance-type deflection element are taken out from the third piezoelectric element 151 and the fourth piezoelectric element 153.

3. Constitution and Manner of Operation of Signal Processing Circuit

Next, the constitution of the signal processing circuit 21 which constitutes the technical feature of the present invention is specifically explained in conjunction with drawings.

Figure 5:
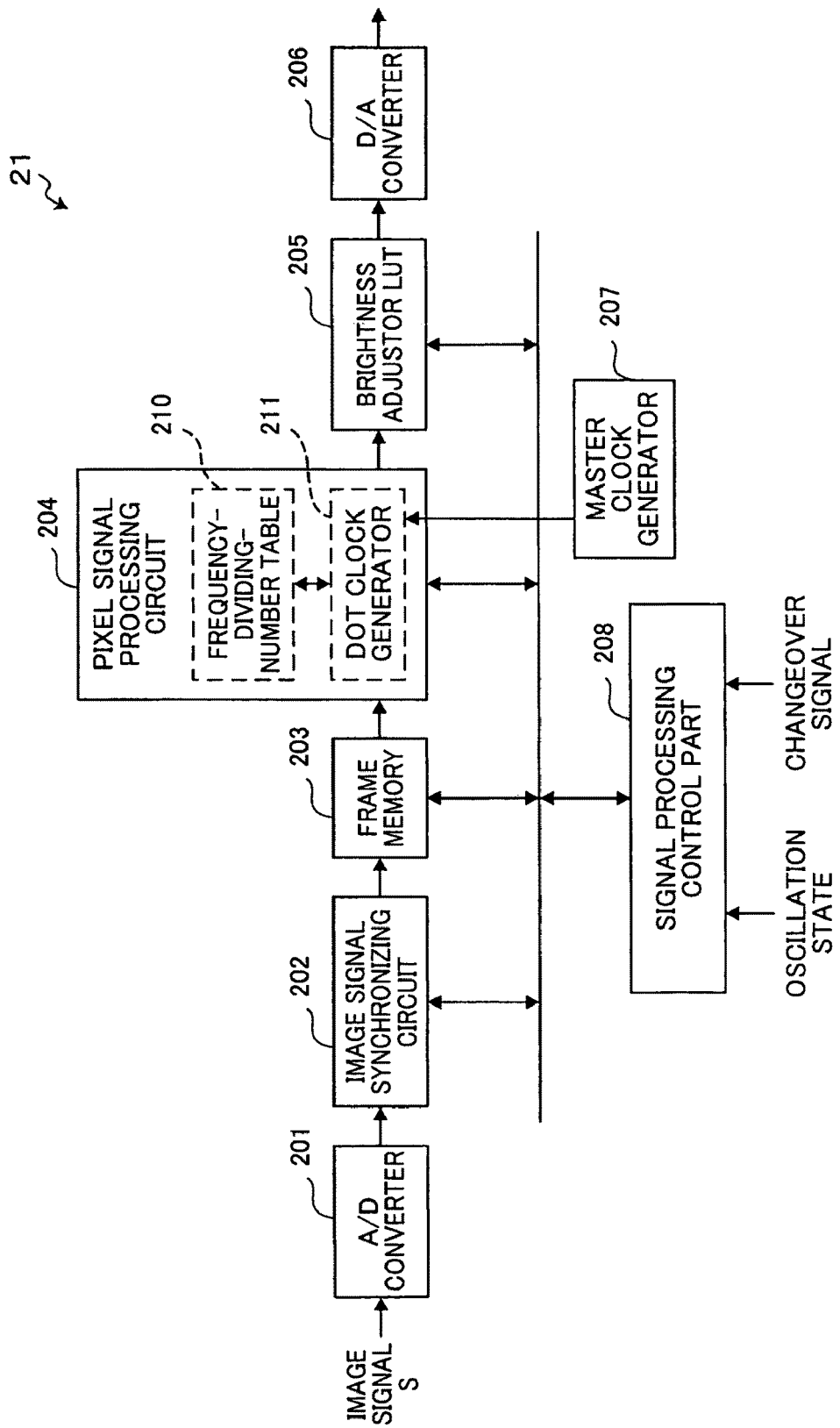
FIG. 5 is a view showing the constitution of a portion of a signal processing circuit shown in FIG. 1.

As shown in FIG. 5, the signal processing circuit 21 includes an A/D converter 201 which digitalizes the image signal S, an image signal synchronizing circuit 202 which synchronizes the digitalized image signal S, a frame memory 203 which stores the image signal outputted from the image signal synchronizing circuit 202 in accordance with every frame, a pixel signal processing circuit 204 which generates dot clocks having a clock cycle corresponding to pixel positions of an image to be displayed, reads the image signal stored in the frame memory 203 for every dot clock per pixel and generates pixel signals for respective colors (B, G, R), a brightness adjustor 205 which adjusts brightnesses of the image signals for respective colors outputted from the pixel signal processing circuit 204 based on a lookup table (brightness table) stored in the inside thereof, a D/A converter 206 which converts the pixel signals for respective colors whose brightnesses are adjusted by the brightness adjustor 205 into analogue signals and respectively outputs the image signals as image signals (B, G, R) 22a to 22c, a master clock generator 207 which generates master clocks constituting basic clocks of the signal processing circuit 21, and a signal processing control part 208 which controls the whole signal processing circuit 21.

(Generation of Dot Clocks)

The pixel signal processing circuit 204 includes a frequency-dividing-number table 210 which sequentially stores the number of master clocks corresponding to the scanning directions of the optical flux in the horizontal direction, in other words, the number of master clocks (hereinafter, also referred to as "master clock frequency dividing number") corresponding to clock cycle of the dot clocks corresponding to the scanning positions of the optical flux from the dot clock at the optical flux scanning start position to the dot clock at the optical flux scanning finish position on a scanning line in the horizontal direction, and a dot clock generator 211 which, based on the frequency-dividing-number table 210, generates dot clocks having clock cycles corresponding to the scanning directions of the optical flux using the resonance-type deflection element 71 by dividing the frequency of the master clocks.

Here, the frequency-dividing-number table 210 is explained specifically.

As shown in FIG. 6, the frequency-dividing-number table 210 is a frequency-dividing-number table which sequentially stores the master clock frequency dividing number which constitutes the number of master clocks corresponding to the clock cycle of the dot clock for every dot clock from the dot clock at the optical flux scanning start position to the dot clock at the optical flux scanning finish position.

The dot clock generator 211 generates the dot clock for reading a pixel signal for every pixel by dividing the frequency of the master clocks by referencing the frequency-dividing-number table 210. The frequency-dividing-number table 210 is a table of an example in which 60 pixels are arranged in the horizontal direction, wherein the numbers of 1 to 60 are sequentially allocated in order of the dot clocks starting from the dot clock at the optical flux scanning start position.

In the frequency-dividing-number table 210 shown in FIG. 6, the master clock frequency dividing numbers are set to "6", "5", ..., "5", "6" in order from the dot clock number 1 to the dot clock number 60. The dot clock generator 211 generates the dot clocks having the clock cycles in which the master clock frequency dividing numbers are set to "6", "5", ..., "5", "6" in order from the optical flux scanning start position. That is, the dot clock generator 211 generates the dot clocks having the clock cycles corresponding to the scanning positions of the optical flux based on the frequency-dividing-number table 210.

Figure 7:
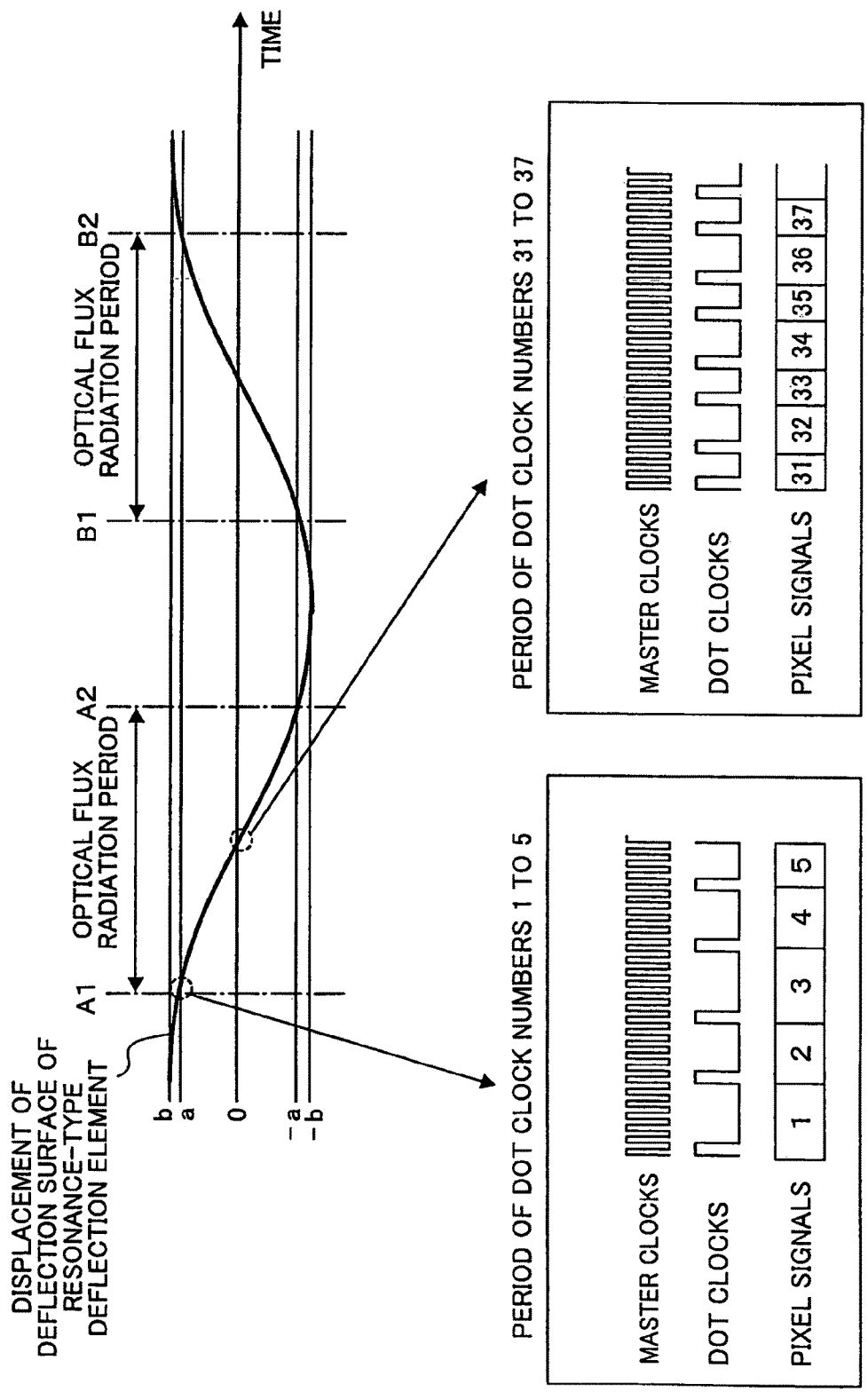
FIG. 7 is a view showing a relationship among dot clocks generated based on the frequency-dividing-number table, master clocks and pixel signals.

FIG. 7 shows the relationship among the dot clocks, the master clocks and the pixel signals from the dot clock number 1 to the dot clock number 5, and the relationship among the dot clocks, the master clocks and the pixel signals from the dot clock number 31 to the dot clock number 37.

As shown in FIG. 7, the deflection surface 120 of the resonance-type deflection element 71 performs the resonance oscillations (swinging) within an angle range from +b to −b using a predetermined position as the reference (0 degree). The optical flux from the light source part 30 is radiated when the displacement position of the deflection surface 120 of the resonance-type deflection element 71 falls within a range from +a to −a. That is, the image display device 1 of this embodiment is configured to radiate the optical flux from the light source part 30 when the deflection surface 120 of the resonance-type deflection element 71 falls within a timing from A1 to A2 (a range from +a to −a) and a timing from B1 to B2 (a range from −a to +a).

Here, the optical flux scanning start position means timing A1 or B1 at which the optical flux is radiated from the light source part 30.

As shown in FIG. 7, in the clock cycle of the dot clock number 1, the master clock frequency dividing number is 6. During this clock cycle, the pixel signal at the first pixel position (pixel number 1) is read by the pixel signal processing circuit 204 and is outputted to the light source part 30. Further, in the clock cycle of the dot clock number 31, the master clock frequency dividing number is 3. During this clock cycle, the pixel signal at the 31st pixel position (pixel number 31) in the horizontal direction is read by the pixel signal processing circuit 204 and is outputted to the light source part 30.

(Relationship Between Dot Clock and Master Clock Frequency Dividing Number)

Here, the relationship between the dot clocks and the master clock frequency dividing numbers in the frequency-dividing-number table 210 is explained in conjunction with FIG. 8. In FIG. 8, only the relationship with respect to the dot clock numbers 1 to 30 is shown and the relationship with respect to the dot clock numbers 31 to 60 is omitted.

Further, in this embodiment, the explanation is made with respect to a case in which the resonance frequency of the resonance-type deflection element 71 is set to 30 kHz, the number of pixels in the horizontal direction is set to 60 dots, the frequency of the master clocks is set to 24 MHz, an effective time is set to 60%, an effective width (a rate of oscillation scanning range +a to −a with respect to a total swing range +b to −b of the deflection surface 120) is set to 80.9%, and the number of master clocks in the radiation period of the optical flux in the horizontal direction is set to 240 dots. Further, the explanation is made assuming that the displacement of the deflection surface 120 draws a sinusoidal wave.

FIG. 8 shows amplitude (%) of the deflection surface 120 at an intermediate position between an optical flux radiation start position and an optical flux radiation finish position of the optical flux for every dot clock which allows scanning such that the scanning positions of the respective pixels are arranged at equal intervals. Further, FIG. 8 also shows an oscillation angle (rad) corresponding to the position of the deflection surface 120 at such amplitude (%), a speed (assuming a speed of the fastest clock number 30 as 1) at such amplitude (%), and an inverse number of the speed (corresponding to a movement time of the deflection surface 120) at such amplitude (%).

Then, a value (here, 3.41) is calculated by dividing the number of master clocks which constitutes the radiation period of the optical flux in the horizontal direction (here, 240) by the total of the inverse numbers of the speeds (the total of the inverse numbers ranging from the dot clock numbers 1 to 60 and being approximately 70.46 here). This value becomes the number of master clocks (including a decimal portion) corresponding to the clock cycle of the dot clocks as a theoretical value at the fastest clock number 30. Hereinafter, this number of master clocks is referred to as a reference value. Here, the clock cycle of the dot clocks which constitutes the theoretical value is a clock cycle which arranges the optical fluxes corresponding to respective dots at equal intervals. That is, the clock cycle of the dot clock means an ideal clock cycle of dot clocks for arranging the center positions of the optical fluxes corresponding to the respective pixels (dots) in the scanning position of the optical fluxes at equal intervals.

Accordingly, the clock cycle of the dot clock which constitutes the theoretical value with respect to every dot clock number becomes a value obtained by multiplying the inverse number of the corresponding speed by the above-mentioned reference value (hereinafter, referred to as "a dot theoretical value"), and assumes a value shown in FIG. 8. In FIG. 8, all digits to the right of the second decimal point are omitted.

Further, the dot theoretical values are cumulatively added in order from the dot clock number 1. A value which is obtained by cumulatively adding dot theoretical values is referred to as a cumulative dot theoretical value. In FIG. 8, the cumulative dot theoretical values which are obtained by cumulatively adding the dot theoretical values are shown in order of the dot clock numbers.

After performing the above-mentioned calculation, the number of master clocks corresponding to the actually-used clock cycle of the dot clock (hereinafter, referred to as "dot correction value") is calculated. The dot correction values are cumulatively added in order from the dot clock number 1. A value which is obtained by cumulatively adding the dot correction values in this manner is referred to as a cumulative dot correction value. In FIG. 8, the cumulative dot correction values which are obtained by cumulatively adding the dot correction values in order of the dot clock numbers are shown.

Here, the dot correction values are calculated as follows.

First of all, the cumulative dot correction values are obtained by rounding the decimal points or less of the cumulative dot theoretical values. Next, the respective dot correction values are obtained based on the cumulative dot correction value. That is, from the cumulative dot correction value corresponding to the dot clock number for which the dot correction value is obtained, the cumulative dot correction value corresponding to the dot clock number preceding such a dot clock number by one is subtracted to obtain the dot correction value. Here, when the difference between the dot correction values of the dot clock numbers adjacent to each other in row is 2 master clocks, the dot correction value which is an average of both dot correction values is adopted.

By calculating the dot correction values as described above, respective conditions described hereinafter are satisfied. Here, provided that the following conditions are satisfied, the dot correction Values may be calculated by methods other than the above-mentioned method.

(First Condition)

The difference between the dot correction value and the dot theoretical value must be equal to or less than 1 master clock. That is, the actually-used clock cycle of the dot clock corresponding to the scanning direction of the optical flux must exhibit an error equal to or less than 1 cycle of the master clock with respect to the clock cycle of the dot clock which constitutes the theoretical value with which the optical fluxes corresponding to the respective dots are arranged at equal intervals.

(Second Condition)

The difference between the clock cycle of the dot clock and the clock cycle of the dot clocks preceding to and succeeding to the former dot clock must be equal to or less than 1 master clock. That is, the cycle differences between the actually-used clock cycle of the dot clock corresponding to the scanning direction of the optical flux and the dot clock cycles of the preceding and succeeding dot clocks must become errors equal to or less than 1 cycle of the master clock.

(Third Condition)

The difference between the corrected dot cumulative value and the theoretical dot cumulative value must be equal to or less than 1 master clock. That is, the difference between the number of master clocks which is obtained by cumulatively adding the master clocks starting from the dot clock corresponding to the optical flux scanning start position (dot clock of dot clock number 1) to the dot clock to be generated corresponding to the radiation finish position (dot clock corresponding to the scanning finish position on one scanning line) and the number of master clocks which constitutes the theoretical value and is obtained by cumulatively adding master clocks which constitute theoretical values corresponding to the dot clocks starting from the dot clock corresponding to the optical flux scanning start position to the dot clock to be generated must be equal to or less than 1.

In this manner, the dot clock generator 211 is configured to generate the dot clocks having clock cycles corresponding to the scanning directions of the optical flux by dividing the frequency of the master clocks based on the frequency-dividing-number table 210 which satisfies the above-mentioned first to third conditions and hence, the optical flux can be scanned such that the scanning directions of the pixels are arranged at equal intervals.

Here, the dot correction values which satisfy a following fourth condition in addition to the above-mentioned first to third conditions may be calculated.

(Fourth Condition)

The clock cycle of each one of the dot clocks ranging from the center (dot clock numbers 30, 31) to respective peripheries (dot clock numbers 1, 60) of a swing range of the deflection surface is set equal to the clock cycle of the dot clock adjacent to each dot cycle on a center side of the swing angle or larger than the clock cycle of the dot clock adjacent to each dot cycle on the center side of the swing angle. That is, ranging from the dot clock (dot clock number 30) to the dot clock (dot clock number 1) or the dot clocks ranging from the dot clock (dot clock number 31) to the dot clock (dot clock number 60), the dot correction value of the own dot clock is prevented from becoming smaller than the dot correction value of the dot clock adjacent to the own dot clock on the center side with respect to the dot clocks. For example, with respect to the dot clocks ranging from the dot clock (dot clock number 30) to the dot clock (dot clock number 1), the dot correction values are set to "3, 3, 3, . . . 4, 4, 5, 5, 5, 5, 6, 6 (setting such that the dot correction value of the own dot clock is prevented from becoming larger than the dot correction value of the dot clock adjacent to the own dot clock on a left side of the above-mentioned arrangement of dot correction numbers (peripheral side of the swing range).

By adopting the dot correction values which satisfy the fourth condition in this manner, there is no possibility that the clock cycle of the dot clocks at a center portion of an image displayed by the image display device 1 fluctuate and hence, the image quality of an image displayed by the image display device 1 can be enhanced.

(Processing for Enhancing Image Quality)

In the above-mentioned dot clock generator 211, when the dot clocks are generated in a state that the first condition to the third condition are satisfied, there generated is a group of dot clocks in which a frequency-dividing-number sequence pattern equal to a frequency-dividing-number sequence pattern of a set of dot clocks formed of two or more continuous dot clocks in the horizontal direction is repeated plural times on one scanning line.

For example, to take a frequency-dividing-number table 210 (hereinafter referred to as "frequency-dividing-number table X1") shown in FIG. 9 as an example, this frequency-dividing-number table X1 shows the presence of such group of dot clocks. That is, as sets of dot clocks each of which is constituted of two or more continuous dot clocks, a1, a2, b1, b2, c1 to c5, d1 to d7, e1, e2 are present, while as a group of dot clocks in which the frequency-dividing-number sequence pattern which is equal to the frequency-dividing-number pattern of each set is repeated plural times, A (a group formed of two sets a1, a2), B (a group formed of two sets b1, b2), C (a group formed of five sets c1 to c5), D (a group formed of seven sets d1 to d7), and E (a group formed of two sets e1,e2) are present.

Figure 10:
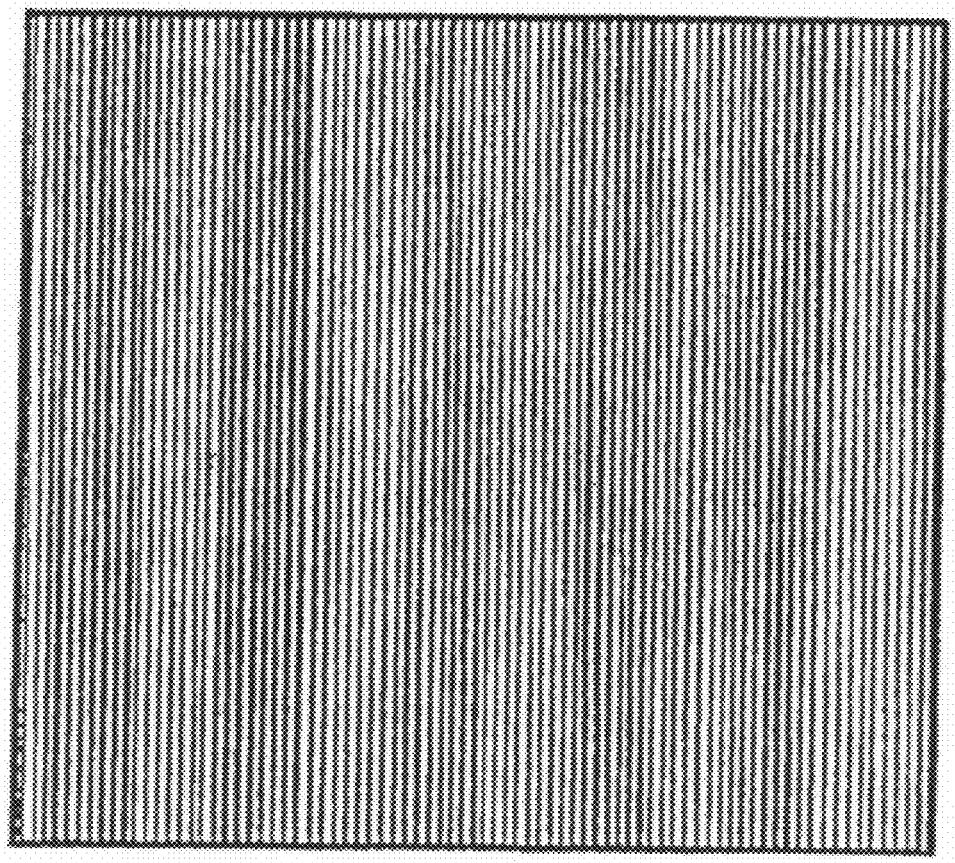
FIG. 10 is a view showing an example of a viewing image when images having a predetermined pixel pattern are displayed continuously.

In this manner, when the groups of dot clocks in which the same frequency-dividing-number sequence pattern is repeated plural times are generated on one scanning line, as shown in FIG. 10, in a continuous display of an image having a predetermined pixel pattern (for example, a pixel pattern which repeats white and black), there appears a stripe pattern in a viewing image.

Accordingly, in the image display device 1 of this embodiment, by preventing the groups of dot clocks in which the same frequency-dividing-number sequence pattern is repeated plural times from being present at the same position continuously over a large number of frames, even when an image having a predetermined pixel pattern is continuously displayed, it is possible to suppress the appearance of a stripe pattern in a viewing image thus enhancing quality of the image.

To be more specific, in the dot clock generator 211, with respect to the group of dot clocks (for example, "A" shown in FIG. 9, hereinafter referred to as "periodical group of dot clocks) formed of a plurality of sets of dot clocks (for example, "a1", "a2" shown in FIG. 9, hereinafter referred to as "periodical set of dot clocks") in which the frequency-dividing-number sequence pattern of the set of dot clocks formed of two or more continuous dot clocks (for example, "6, 5" of "a1" shown in FIG. 9) is repeated plural times on one scanning line, by changing the frequency-dividing-number sequence pattern of each set of dot clocks while maintaining a total value of frequency dividing number necessary for generating each set of dot clocks at a constant value, it is possible to suppress a stripe pattern from being viewed in an image.

In this manner, as a method of changing the frequency-dividing-number sequence pattern of each set in the periodical group of dot clocks, (1) a method of changing the frequency-dividing-number sequence pattern in accordance with every scanning line (here, horizontal scanning line) and (2) a method of changing the frequency-dividing-number sequence pattern in accordance with every one or more frames are named. The image display device 1 of this embodiment can select either one of these methods by setting.

First of all, the change of the frequency-dividing-number sequence pattern in accordance with every scanning line is explained. The change of the frequency-dividing-number sequence pattern in accordance with every scanning line is performed by changing over the frequency-dividing-number table used in the generation of the dot clocks in the dot clock generator 211 in accordance with every scanning line. For example, in addition to the frequency-dividing-number table X1 shown in FIG. 9, a frequency-dividing-number table 210 shown in FIG. 11 (hereinafter referred to as "frequency-dividing-number table X2") is prepared, and these frequency-dividing-number tables X1, X2 are changed over in accordance with every scanning line as shown in FIG. 12. Here, the dot clock generator 211 includes a changeover part which changes over these frequency-dividing-number tables, and the dot clock generator 211 performs the changeover of the frequency-dividing-number tables X1, X2 thus changing the frequency-dividing-number sequence patterns of the periodical sets of dot clocks.

Here, in the frequency-dividing-number table X2 shown in FIG. 11, the clock cycles of respective dot clocks which constitute the periodical set of dot clocks in the frequency-dividing-number table X1 shown in FIG. 9 are changed. This change is performed by changing the frequency-dividing-number sequence pattern of each set of dot clocks while maintaining a total value of frequency dividing numbers necessary for generating each set of dot clocks. For example, the periodical set of dot clocks "a1" is "6, 5" and the number of master clocks necessary for generating the periodical set of dot clocks is "11" in FIG. 9 and hence, the cycles of the respective dot clocks are changed to "5, 6" in the frequency-dividing-number table X2 shown in FIG. 11 thus maintaining a total value of the frequency dividing numbers necessary for generating these master clocks at a constant value.

Here, when the number of the dot clocks in the periodical set of dot clocks is 3 or more, the frequency-dividing-number sequence pattern of each set of dot clocks is changed using frequency-dividing-number sequence patterns whose number of kinds differs corresponding to the number of dot clocks which constitute the periodical set of dot clocks. For example, when the cycle of the respective dot clocks in the periodical set of dot clocks is "3, 3, 4", the change of the frequency-dividing-number sequence pattern is performed by sequentially changing over three frequency-dividing-number sequence patterns of "3, 4, 3" and "4, 3, 3" in addition to the "3, 3, 4". Here, when the number of dot clocks which constitute the periodical set of dot clocks differs among these periodical sets, the frequency-dividing-number tables number of which is the least common multiple of these numbers is prepared (for example, when there are the periodical set of dot clocks constituted of two dot clocks and the periodical set of dot clocks constituted of three dot clocks, six frequency-dividing-number tables) and hence, it is possible to properly change the frequency-dividing-number sequence patterns of the respective dot clocks of all periodical sets of dot clocks.

Further, the frequency-dividing-number sequence patterns of respective sets may be changed in accordance with every plural horizontal scanning lines in place of changing of the frequency-dividing-number sequence patterns for every scanning line. For example, the frequency-dividing-number sequence patterns of respective sets may be changed in accordance with every two horizontal scanning lines.

Next, the change of the frequency-dividing-number sequence pattern in accordance with every frame is explained. The change of the frequency-dividing-number sequence pattern in accordance with every frame is performed by changing over the frequency-dividing-number table used for generation of dot clocks in accordance with every one or more frames in the dot clock generator 211. For example, the dot clocks are generated by changing over the frequency-dividing-number table X1 shown in FIG. 9 and the frequency-dividing-number table X2 shown in FIG. 11 in accordance with every predetermined number of frames. For example, as shown in FIG. 13, the frequency-dividing-number table X1 and the frequency-dividing-number table X2 are sequentially changed over in accordance with every one frame. Here, the dot clock generator 211 includes a changeover part for changing over these frequency-dividing-number tables X1, X2, and the dot clock generator 211 performs the changeover of the frequency-dividing-number table using the frequency-dividing-number table changed over by the changeover part.

Further, when the number of dot clocks which constitute the periodical set of dot clocks is three or more, the change of the frequency-dividing-number sequence pattern of each set is performed based on the frequency-dividing-number sequence patterns whose number of kinds differs corresponding to the number of dot clocks which constitute the periodical set of dot clocks. For example, when the cycle of the respective dot clocks in the periodical set of dot clocks is "3, 3, 4", the change of the frequency-dividing-number sequence pattern may be performed by sequentially changing over three frequency-dividing-number sequence patterns of "3, 4, 3" and "4, 3, 3" in addition to the cycle of "3, 3, 4" in accordance with every frame.

Further, in place of changing the frequency-dividing-number sequence patterns for every scanning line, a plurality of scanning lines which constitutes one frame may be divided into a predetermined number of groups, and the change of the frequency-dividing-number sequence pattern of each periodical set of dot clocks may be performed with respect to one group in one frame thus performing the change of the frequency-dividing-number sequence patterns of respective sets in plural frames. For example, the frequency-dividing-number sequence pattern may be changed for every ten scanning lines in each frame in order of (a), (b) and (c) in FIG. 14 thus changing the frequency-dividing-number sequence patterns with respect to all scanning lines in three frames.

As described above, the dot clock generator 211 can, by changing the frequency-dividing-number sequence pattern while maintaining a total value of frequency dividing numbers necessary for generating each set at a constant value with respect to the periodical sets of dot clocks in the periodical group of dot clocks, it is possible to suppress a stripe pattern from being viewed in an image.

In this manner, the brightness value of the pixel signal read based on the dot clock generated by the dot clock generator 211 is adjusted by reference to a lookup table.

In the lookup table, as shown in FIG. 15, a brightness correction rate which assumes the brightness value corresponding to the clock cycle of the dot clock generated by the dot clock generator 211 is defined corresponding to the dot clock number. That is, the brightness information corresponding to the clock cycle of the dot clock is stored sequentially for every dot clock from the dot clock at the optical flux scanning start position.

The brightness correction rate becomes, for example, in the case shown in FIG. 8, a value substantially equal to the inverse number of a speed of the resonance-type deflection element 71. Accordingly, a product obtained by multiplying the brightness correction rate by the speed of the resonance-type deflection element 71 always assumes 1.

In this manner, the brightness value of the pixel signal is adjusted by correcting the brightness value of the pixel signal with the brightness correction rate of a value substantially equal to the inverse number of the speed of the resonance-type deflection element 71, that is, with the brightness correction rate corresponding to the clock cycle of the dot clock (in other words, master clock frequency dividing number). Accordingly and hence, any dot of the image displayed by the image display device 1 acquires the brightness distribution substantially equal to the brightness distribution of the original image based on the image signal S. Accordingly, it is possible to suppress the generation of the brightness irregularities thus enhancing the quality of the image displayed by the image display device 1.

The lookup table is provided corresponding to the frequency-dividing-number table 210. That is, the lookup tables which respectively correspond to the plurality of frequency-dividing-number tables 210 are provided.

Further, in an interlocking manner with the above-mentioned selective changeover of the frequency-dividing-number table 210, the lookup table corresponding to the changed-over frequency-dividing-number table 210 is selected.

Accordingly, even when the frequency-dividing-number table 210 is changed over, the generation of the brightness irregularities can be suppressed and hence, the quality of the image of the image display device 1 can be enhanced.

As described above, according to the image display device 1 of this embodiment, with the use of the frequency-dividing-number table 210 and the lookup table, the high image quality can be maintained while constituting the optical scanning device without using the arcsin θ correction lens.

Here, for every resonance frequency of the resonance-type deflection element 71 and for every swing range of the deflection surface 120 of the resonance-type deflection element 71, the frequency-dividing-number table 210 and the lookup table corresponding to the resonance frequency and the swing range may be used. In this case, the dot clock generator 211 takes out the frequency-dividing-number table 210 corresponding to the resonance frequency of the resonance-type deflection element 71 and the swing range of the deflection surface 120 of the resonance-type deflection element 71, and generates the dot clocks of the clock cycle corresponding to the swing range of the deflection surface 120 while changing the frequency-dividing-number sequence pattern of the periodical set of the dot clocks.

Due to such constitution, even when the resonance frequency of the resonance-type deflection element 71 is deviated or even when swing range of the deflection surface 120 of the resonance-type deflection element 71 is changed due to a temperature change or with a lapse of time, the dot clock generator 211 can generate the dot clocks of an appropriate clock cycle whereby the image display device 1 can enhance image quality of an image displayed by the image display device 1. Further, this embodiment can also cope with the irregularities (individual differences) of characteristics of the resonance-type deflection elements 71 for respective manufacturing lots.

Second Embodiment

In the image display device of the above-mentioned first embodiment, the dot clocks are generated using the frequency-dividing-number table 210. In the second embodiment, however, the dot clocks are generated by arithmetic calculation processing without using the frequency-dividing-number table 210.

The image display device of the second embodiment differs, as shown in FIG. 16, from the image display device of the first embodiment only with respect to the constitution of the pixel signal processing circuit and hence, the explanation of the other parts is omitted here.

As shown in FIG. 16, a dot clock generator 211' of a pixel signal processing circuit 204' includes a clock cycle theoretical value calculation part 211a, a cumulative addition value differential detecting part 211b, a periodicity detector 211c and a frequency-dividing-number sequence pattern changer 211d and generates dot clocks having clock cycles based on arithmetic calculation results from these parts.

The clock cycle theoretical value calculation part 211a calculates, based on an oscillation state such as a swing range and oscillation frequency of a deflection surface 120 of the resonance-type deflection element 71 detected by an oscillation state detector 73 in response to a displacement signal outputted from the displacement signal generator of the resonance-type deflection element 71, the number of master clocks (master clock frequency dividing number) corresponding to the clock cycle of the dot clock which constitutes a theoretical value for every dot clock.

Further, the cumulative addition value differential detecting part 211b calculates a differential between the number of master clocks which is obtained by cumulatively adding the master clocks from the dot clock corresponding to the optical flux scanning start position to the dot clock to be generated and the number of master clocks which constitutes a theoretical value and is obtained by cumulatively adding the master clocks which constitute theoretical values corresponding to dot clocks from the dot clock corresponding to the optical flux scanning start position to the dot clock to be generated.

The dot clock generator 211' generates the dot clocks having the clock cycles which satisfy the above-mentioned first to third conditions using the clock cycle theoretical value calculation part 211a and the cumulative addition value differential detecting part 211b.

Further, the dot clock generator 211' includes the periodicity detector 211c and the frequency-dividing-number sequence pattern changer 211d for changing a cycle pattern of dot clocks generated in this manner in accordance with every scanning line or in accordance with every frame.

The periodicity detector 211c detects, with respect to the dot clocks on one scanning line for horizontal scanning generated in the above-mentioned manner, a group of dot clocks which is constituted of plural sets of dot clocks in which a frequency-dividing-number sequence pattern of the set of the dot clocks constituted of two or more continuous dot clocks is repeated plural times.

The frequency-dividing-number sequence pattern changer 211d changes, with respect to the group of dot clocks detected by the periodicity detector 211c, the frequency-dividing-number sequence pattern of each set of dot clocks while maintaining a total value of frequency dividing numbers necessary for generating each set of dot clocks at a constant value.

Here, in changing the frequency-dividing-number sequence pattern in accordance with every scanning line in the horizontal direction, the operation and the non-operation of the periodicity detector 211c and the frequency-dividing-number sequence pattern changer 211d are repeated in accordance with every scanning line. On the other hand, in changing the frequency-dividing-number sequence pattern in accordance with every frame, the operation and the non-operation of the periodicity detector 211c and the frequency-dividing-number sequence pattern changer 211d are repeated in accordance with every frame.

In this manner, according to the image display device of the second embodiment, the dot clocks are generated by arithmetic calculation processing and hence, even when an oscillation state such as the swing range of the deflection surface 120 and the oscillation frequency of the resonance-type deflection element 71 is largely changed, it is unnecessary to ensure a storage capacity which becomes necessary when a frequency-dividing-number table is used.

Although several embodiments of the present invention have been explained in detail heretofore in conjunction with the drawings, these are provided merely for an illustration purpose, and the present invention can be carried out in other modes to which various modifications and variations are applied based on knowledge of those who are skilled in the art.

For example, although the embodiments in which the present invention is applied to the retinal scanning display have been explained, the present invention is also applicable to a laser printer or the like.

What is claimed is:
1. An optical scanning device comprising:
an optical flux generator which is configured to generate an optical flux in response to an image signal read for every dot clock and to radiate the optical flux;
a resonance-type deflection element which has a deflection surface for scanning the optical flux;
a drive signal generator which is configured to generate a drive signal for oscillating the resonance-type deflection element in a resonance state; and
a dot clock generator which is configured to generate dot clocks by dividing master clocks which constitute basic clocks with a frequency dividing number corresponding to a scanning position, wherein
the dot clock generator is configured to, with respect to a group of dot clocks which is formed of plural sets of dot clocks in which a frequency-dividing-number sequence pattern of the set of dot clocks each of which is constituted of two or more continuous dot clocks is repeated plural times on one scanning line, change the frequency-dividing-number sequence pattern of said each set of dot clocks while maintaining a total value of frequency dividing numbers necessary for generating said each set of dot clocks at a constant value.

2. An optical scanning device according to claim 1, wherein the dot clock generator is configured to change the frequency-dividing-number sequence pattern of said each set of dot clocks by using the frequency-dividing-number sequence patterns whose number of kinds differs from each other corresponding to the number of dot clocks which constitute said each set of dot clocks in a switchable manner.

3. An optical scanning device according to claim 1, wherein the dot clock generator is configured to change the frequency-dividing-number sequence pattern of said each set of dot clocks in accordance with every one or more scanning lines.

4. An optical scanning device according to claim 1, wherein the dot clock generator is configured to change the frequency-dividing-number sequence pattern of said each set of dot clocks in accordance with every one or more frames.

5. An optical scanning device according to claim 1, wherein the dot clock generator is configured to divide a plurality of scanning lines which constitute a frame into a predetermined number of groups, and to change the frequency-dividing-number sequence pattern of said each set of dot clocks with respect to one group of dot clocks in one frame thus changing the frequency-dividing-number sequence pattern of said each set of dot clocks on the plurality of scanning lines in plural frames.

6. An optical scanning device according to claim 1, wherein the optical scanning device includes:
 a plurality of frequency-dividing-number tables which sequentially stores master clock frequency dividing numbers corresponding to the respective dot clocks necessary for one scanning line therein for every dot clock from the dot clock at an optical flux scanning start position; and
 a changeover part which changes over the frequency-dividing-number tables, and
 the dot clock generator is configured to change the frequency-dividing-number sequence pattern of said each set of dot clocks using the frequency-dividing-number table changed over by the changeover part.

7. An optical scanning device according to claim 1, wherein the dot clock generator includes:
 a periodicity detector which is configured to detect a group of dot clocks which is formed of plural sets of dot clocks in which a frequency-dividing-number sequence pattern of the set of dot clocks each of which is constituted of two or more continuous dot clocks is repeated plural times on one scanning line; and
 a frequency-dividing-number sequence pattern changer which is configured, with respect to the group of dot clocks detected by the periodicity detector, to change the frequency-dividing-number sequence pattern of said each set of dot clocks while maintaining a total value of frequency dividing numbers necessary for generating said each set of dot clocks at a constant value.

8. An optical scanning device according to claim 1, wherein the dot clock generator is configured to sequentially generate the dot clocks so as to satisfy:
 a first condition that an actually-used clock cycle of the dot clock corresponding to a scanning direction of the optical flux becomes an error equal to or less than one cycle of the master clock with respect to the clock cycle of the dot clock which constitutes a theoretical value which arranges the optical fluxes corresponding to the respective dots at equal intervals;
 a second condition that cycle difference between the actually-used clock cycle of the dot clock corresponding to the scanning direction of the optical flux and the clock cycles of the preceding and succeeding dot clocks becomes an error equal to or less than one cycle of the master clock; and
 a third condition that difference between the number of master clocks which is obtained by cumulatively adding the master clocks starting from the dot clock corresponding to the optical flux scanning start position to the dot clock to be generated and the number of master clocks which constitutes a theoretical value and is obtained by cumulatively adding the master clocks which constitute theoretical values corresponding to the dot clocks starting from the dot clock corresponding to the optical flux scanning start position to the dot clock to be generated is equal to or less than one cycle of the master clock, and
 the optical flux generator is configured to radiate the optical flux having brightness corresponding to the clock cycle of the dot clock generated by the dot clock generator.

9. An optical scanning device according to claim 8, wherein the dot clock generator is configured to generate the dot clocks so as to satisfy a fourth condition that the clock cycle of each one of the dot clocks ranging from the center to respective peripheries of a swing range of the deflection surface is set equal to the clock cycle of the dot clock adjacent to said each dot cycle on a center side of the swing range or larger than the clock cycle of the dot clock adjacent to said each dot cycle on the center side of the swing range.

10. An optical scanning device according to claim 8, wherein the optical scanning device further comprises:
 a displacement signal generator which is configured to generate a displacement signal corresponding to swinging of the deflection surface; and
 an oscillation state detector which is configured to detect an oscillation state of the deflection surface in response to the displacement signal, and
 the dot clock generator includes:
 a clock cycle theoretical value calculation part which is configured to calculate the number of master clocks corresponding to the clock cycle of the dot clock which constitutes the theoretical value for every dot clock based on the oscillation state of the deflection surface detected in response to the displacement signal; and
 a cumulative addition value differential detecting part which is configured to calculate a differential between the number of master clocks which is obtained by cumulatively adding the master clocks from the dot clock corresponding to the optical flux scanning start position to the dot clock to be generated and the number of master clocks which constitutes a theoretical value and is obtained by cumulatively adding the master clocks which constitute theoretical values corresponding to dot clocks from the dot clock corresponding to the optical flux scanning start position to the dot clock to be generated, and
 the dot clock having the clock cycle which satisfies the first condition to the third condition is generated by the dot clock generator based on a calculation result of the clock cycle theoretical value calculation part and a calculation result of the cumulative addition value differential detecting part.

11. An optical scanning device according to claim 1, wherein the resonance-type deflection element includes:
 a first beam portion which is connected to one side of the deflection surface which reflects an incident light; and
 a first piezoelectric element portion which is configured to resiliently deform the first beam portion, and
 the displacement signal generator includes:
 a second beam portion which is connected to the other side of the deflection surface and is configured to be displaced corresponding to swinging of the first beam portion; and
 a second piezoelectric element portion which generates a displacement signal corresponding to a displacement of the second beam portion.

12. An image display device having an optical scanning device and being configured to display an image by scanning an optical flux which is modulated in response to an image signal using the optical scanning device, wherein the optical scanning device comprises:

an optical flux generator which is configured to generate an optical flux in response to an image signal read for every dot clock and radiates the optical flux;

a resonance-type deflection element which has a deflection surface for scanning the optical flux;

a drive signal generator which is configured to generate a drive signal for oscillating the resonance-type deflection element in a resonance state; and a dot clock generator which is configured to generate dot clocks by dividing master clocks which constitute basic clocks with a frequency dividing number corresponding to a scanning position, wherein the dot clock generator is configured to, with respect to a group of dot clocks which is formed of plural sets of dot clocks in which a frequency-dividing-number sequence pattern of the set of dot clocks each of which is constituted of two or more continuous dot clocks is repeated plural times on one scanning line, change the frequency-dividing-number sequence pattern of each set of dot clocks while maintaining a total value of frequency dividing numbers necessary for generating said each set of dot clocks at a constant value.

13. A retinal scanning display having an optical scanning device and being configured to perform a projection display of an image on a retina of an eye by scanning an optical flux which is modulated in response to an image signal using the optical scanning device, wherein the optical scanning device comprises:

an optical flux generator which is configured to generate an optical flux in response to an image signal read for every dot clock and radiates the optical flux;

a resonance-type deflection element which has a deflection surface for scanning the optical flux;

a drive signal generator which is configured to generate a drive signal for oscillating the resonance-type deflection element in a resonance state; and a dot clock generator which is configured to generate dot clocks by dividing master clocks which constitute basic clocks with a frequency dividing number corresponding to a scanning position, wherein the dot clock generator is configured to, with respect to a group of dot clocks which is formed of plural sets of dot clocks in which a frequency-dividing-number sequence pattern of the set of dot clocks each of which is constituted of two or more continuous dot clocks is repeated plural times on one scanning line, change the frequency-dividing-number sequence pattern of each set of dot clocks while maintaining a total value of frequency dividing numbers necessary for generating said each set of dot clocks at a constant value.

* * * * *